United States Patent [19]

Radtke

[11] Patent Number: 5,406,689
[45] Date of Patent: Apr. 18, 1995

[54] BASKET CONFIGURATION FOR AN AEROSOL CONTAINER CLOSURE

[75] Inventor: Charles S. Radtke, Little Ferry, N.J.

[73] Assignee: Precision Valve Corporation, Yonkers, N.Y.

[21] Appl. No.: 884,611

[22] Filed: May 15, 1992

Related U.S. Application Data

[63] Continuation of Ser. No. 652,315, Feb. 6, 1991, abandoned, which is a continuation of Ser. No. 521,355, May 9, 1990, abandoned, which is a continuation-in-part of Ser. No. 375,195, Jun. 30, 1989, abandoned.

[51] Int. Cl.⁶ .......................................... B23P 25/00
[52] U.S. Cl. ...................................... 29/527.1; 413/8; 413/9; 413/10
[58] Field of Search ................. 413/8, 9, 10; 29/527.1, 29/527.2

[56] References Cited

U.S. PATENT DOCUMENTS

| | | | |
|---|---|---|---|
| 1,273,783 | 7/1918 | Christenson | 277/12 |
| 1,832,321 | 11/1931 | Owens | 413/9 |
| 2,117,807 | 5/1938 | Jesser | 220/357 |
| 3,087,639 | 4/1963 | Fischer | 215/345 |
| 3,312,376 | 1/1967 | Rooney | 277/12 |
| 3,342,381 | 9/1967 | Simons et al. | 222/402.1 |
| 3,344,943 | 10/1967 | Zipper | 206/515 X |
| 3,417,177 | 12/1968 | Simons et al. | 264/230 |
| 3,443,006 | 5/1969 | Simons et al. | 264/249 |
| 3,466,731 | 9/1969 | Acton et al. | 413/9 X |
| 4,515,285 | 5/1985 | Klinganhagen | 220/66 |
| 4,546,525 | 10/1985 | Abplanalp | 29/33 K |
| 4,547,948 | 10/1985 | Abplanalp | 29/417 |
| 4,559,198 | 12/1985 | Abplanalp et al. | 264/259 |
| 4,621,964 | 11/1986 | Radtke et al. | 413/9 |
| 4,792,067 | 12/1988 | Greenebaum, II | 222/402.1 |

FOREIGN PATENT DOCUMENTS

| | | | |
|---|---|---|---|
| 646737 | 6/1937 | Germany | 413/9 |
| 89/00538 | 3/1989 | WIPO | 222/402 |

*Primary Examiner*—Carl J. Arbes
*Attorney, Agent, or Firm*—Kilgannon & Steidl

[57] ABSTRACT

A gasketed mounting cup for an aerosol container having at least one annular sealing bead of gasket material in the channel portion of the mounting cup and method for making same.

10 Claims, 6 Drawing Sheets

BASKET CONFIGURATION FOR AN AEROSOL CONTAINER CLOSURE

This is a continuation of application Ser. No. 07/652,315, filed on Feb. 6, 1991 (abandoned) which is a continuation of Ser. No. 07/521,355, filed on May 9, 1990 (abandoned), which is a CIP of Ser. No. 07/375,195, filed on Jun. 30, 1989 (abandoned).

BACKGROUND

Aerosol dispensing containers have found widespread use in the packaging of fluid materials including a variety of both liquid and powdered particulate products. Such containers are provided with a valve-controlled discharge orifice and operate by the action of a volatile propellant which is confined within the container together with the product to be dispensed. Because the propellant has an appreciable vapor pressure at room temperature, the product in the closed container is maintained under superatmospheric pressure.

A typical aerosol unit comprises a hollow cylindrical container which is tightly closed at one end and is provided with an opening at its opposite end for receiving a dispensing valve assembly. A closure, commonly referred to as a mounting cup, serves as the closure for the container and as a support for the valve assembly. Typically, the mounting cup comprises a pedestal portion for mounting the valve unit, a panel portion extending from the pedestal portion, a skirt portion depending from the periphery of the panel, and an annular channel portion extending outwardly from the skirt. When the mounting cup is placed in sealing position on the container, the channel is positioned over the bead surrounding the container opening and the lower portion of the skirt adjacent to the channel is flared or clinched outwardly against the container wall adjacent the bead. To ensure adequate sealing between the closure and the container, the cup is provided with a gasket in the channel, or predominantly in the channel, of the cup.

Heretofore, mounting cup seals have been formed by disposing so-called "cup" gasket in the channel. This type of gasket has the disadvantage of not being stationary relative to the mounting cup during propellant filling or other valve unit assembly operations with the undesirable consequence that when the mounting cup and container are clinched to effect the seal, the gasket is often disposed at an angled position, and thus, the seal may be less effective.

Another commercial method for disposing the gasket onto the mounting cup consists in forming the gaskets in situ from liquid gasket-forming compositions comprising an elastomer dispersed or dissolved in volatile liquid vehicles, so called "flowed-in" gasket. In the manufacture of such a gasket, the liquid composition is deposited in the desired configuration in the channel of the cup while the cup is rotated beneath a metering nozzle through which the gasket composition flows. The deposit is then converted into a dry solid sealing mass by expelling the liquid vehicle at elevated temperatures. Though this technique of flowing gaskets into place has received wide commercial acceptance, it suffers from the disadvantages of requiring an elaborate drying operation, wherein the mounting cup must be handled carefully so as to avoid undue upset from the horizontal; costly recovery apparatus for the expelled liquid also must be provided. In sum, the flowed-in gasket is an expensive step in the formation of the mounting cup. See U.S. Pat. No. 3,342,381 as an example of the "flowed-in" gasket.

Other techniques for disposing a gasket onto the mounting cup are described in U.S. Pat. No. 3,417,177, wherein the gasket seal is made of heat shrinkable material. After placing a band of gasket material on the skirt, the gasket having a greater diameter than the outside diameter of the skirt of the mounting cup, the cup is heated at a temperature and for a time sufficient to shrink the band into tight frictional engagement with the skirt.

Another similar technique is that disclosed in U.S. Pat. No. 3,443,006, wherein a band of gasket material is swelled through the use of a suitable swelling agent so as to increase its diameter to fit over the skirt of the mounting cup. Subsequently, the swelling agent is removed from the gasket material so that the band will come into tight frictional engagement with the skirt.

Both the heat shrink and swelling techniques for applying a gasket material to the mounting cup have the disadvantage of being costly and relatively time consuming procedures. Note in U.S. Pat. No. 3,417,177, column 4, lines 27-31, that the positioned bands must be heated to 240° F. for about 2-3 minutes in order to obtain a tight friction fit. In the procedure of U.S. Pat. No. 3,443,006, the bands must stand in the swelling liquid for a period of ½ to 1½ minutes according to example 2 of the '006 patent and then allowed to stand for the drying period. Also, in any mass production utilizing the '006 system, an organic liquid recovery system must be employed.

In the U.S. Pat. Nos. 4,546,525 and 4,547,948 is described a novel gasketed mounting cup system, including novel method and apparatus, wherein the gasket material is disposed on the mounting cup in the preferred position for effecting a seal between the mounting cup and the bead of the container; and further wherein the disadvantages associated with the aforementioned techniques of applying the gasket material to the cup are obviated. Also, an apparatus and method is provided wherein gaskets are applied to aerosol mounting cups in an exceptionally rapid and efficient manner to form gasketed-mounting cups having excellent sealing characteristics. In general, the method of invention of the aforesaid U.S. Pat. Nos. 4,546,525 and 4,547,948 comprises passing a tubular sleeve of gasket material onto a compressible mandrel; initially positioning and aligning the skirt of the mounting cup and the contiguous end of the mandrel such that the sleeve of gasket material may pass onto the skirt, said mandrel having fixed and moveable portions with respect to each other and to their movement toward and away from the mounting cup; urging the moveable portion of the gasket material bearing mandrel toward the mounting cup such that the gasket material passes onto the skirt of the cup; causing the moveable portion of the mandrel to retract to its initial position, cutting the sleeve at a point between the mounting cup and the mandrel to leave a band of gasket material; and subsequently, advancing the mounting cup to a station whereat the band of the gasket material is urged further onto the skirt of the mounting cup, whereby, the band of gasket material does not extend beyond the skirt of the mounting cup. Subsequently, the gasket is advanced to the ultimately desired position on the mounting cup.

U.S. Pat. No. 4,559,198 concerns a further refinement of a "sleeve" type gasket system which employs annular (or radial) compressive deformations or "ribs" in the band of gasket material. This ribbing imparts to the gasket a resistance to being dislodged during "under the cup" propellant filling operations. This ribbing also imparts to the gasket a resistance to being repositioned on the mounting cup by the gasket returning to its initial position.

In addition to the type of mounting cup gasket systems described heretofore, namely, "cut", "flowed-in" and "sleeve" gasket, a recent commercial system involves laminating a plastic material to a sheet of the metal and subsequently forming the laminated plastic sheet into a mounting cup. The thickness of the plastic laminate is usually on the order of 0.008-010", thinner than the sleeve gasket and substantially thinner than the cut or flowed-in gasket.

This variation in gasket thickness among the several gasket systems further complicated by the fact that the channel portion of the mounting cups manufactured by the valve assembly plants and the annular beads of the aerosol container manufactured by container plants have nominal variations which are within quality control limits, often produce a defective seal in a completed aerosol product which may remain undetected until ultimately discovered by the consumer.

Recently attention has been focused on modifications of the shape and configuration of the mounting cup used over the past twenty-five years in the aerosol industry. Such a modification is described in U.S. Pat. No. 4,792,067. This modification of the mounting cup comprises a channel portion for sealing with the bead of the container. The channel portion having an inner region contour being substantially different in shape from the inner surface contour of the annular bead of the container. The difference in the shape of the inner region contour of the channel portion from the shape of the inner surface contour of the annular bead allows only a portion of the inner region contour of the peripheral rim to contact the inner surface contour of the annular bead when the mounting cup is disposed on the container. The shape of the inner region contour of the peripheral rim is deformed when the mounting cup is crimped to the annular bead of the container. The deformation of the inner region contour reforms the shape of the inner region contour to be substantially the same shape as the inner surface contour of the annular bead to provide a sealing engagement between the mounting cup and the container.

Another modification of the shape and configuration of the mounting cup is described in International Application Number: PCT/US88/02489, International Publication No. WO89/00538, which is abandoned, and corresponding U.S. Ser. No. 312,397, which disclosure is incorporated herein by reference. This modification of the mounting cup comprises a non-deformable, annular indent or depression in the curved portion of the channel portion of a gasketed mounting cup. This indent is designed to retain its shape through the clinching process, after which it provides an annular band of enhanced sealing between the mounting cup and the bead of the container.

As is apparent, various systems have been used in the prior art in an attempt to improve the seal between the channel portion of the mounting cup and the annular bead of the aerosol container. Nonetheless, this seal between the mounting cup and the aerosol container remains of great concern to both the valve assembly plants and the filling plants since it must be capable of being gas tight for a period of years. In addition, the seal between the mounting cup and the aerosol container must be low in cost to enable aerosol products to be competitive with non-aerosol products in the consumer market.

It is an object of this invention to improve the gasket on an aerosol valve mounting cup by forming an integral sealing bead within the gasket structure thereby making an annular seal between the mounting cup and the annular bead of the aerosol container.

Another object of this invention is to provide an improved gasket for an aerosol valve mounting cup without any increased material cost.

Another object of this invention is to provide an improved gasket for an aerosol valve mounting cup which can be used with modified channel mounting cups.

Another object of this invention is to provide an improved gasket for an aerosol valve mounting cup which has an integral sealing bead which can be positioned very precisely within the channel portion of the mounting cup.

The foregoing objects merely illustrate some of the more important features of this invention. It will be readily appreciated that the disclosed invention can be easily adapted to any closure system which requires an annular seal between a cup shaped member and a vessel.

SUMMARY OF THE INVENTION

Broadly stated, this invention comprises a gasketed mounting cup having a sealing bead of gasket material circumferentially located in the channel portion of the mounting cup.

Preferably, the sealing bead is offset from the centerline (deepest point) of the channel.

The present invention will be more clearly understood by referring to the drawings herein and the discussion relating thereto.

The present invention will be more clearly understood by referring to the drawings herein and the discussion relating thereto.

DESCRIPTION OF THE INVENTION

Figure 1:
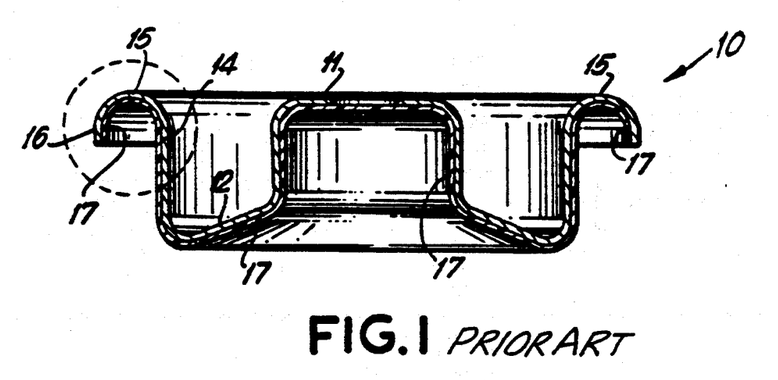
FIG. 1 is an elevated sectional view of a mounting cup of the prior art having a laminated gasket on the surface thereof.

FIG. 1 shows a typical aerosol valve mounting cup of the prior art generally designated as 10. The mounting cup has a pedestal portion 11 which rises from the interior edge of a panel portion 12. A skirt 14 rises from the exterior edge of the panel portion 12 opposite the pedestal portion and concentric thereto. The top portion of the skirt 14 curves into a channel portion 15 which terminates in edge portion 16. The channel portion 15, edge portion 16 and the top of skirt 14 form an annular convex receptor for the standard bead of an aerosol container. A gasket material 17 is shown laminated to the under surface of the mounting cup 10.

Figure 2:
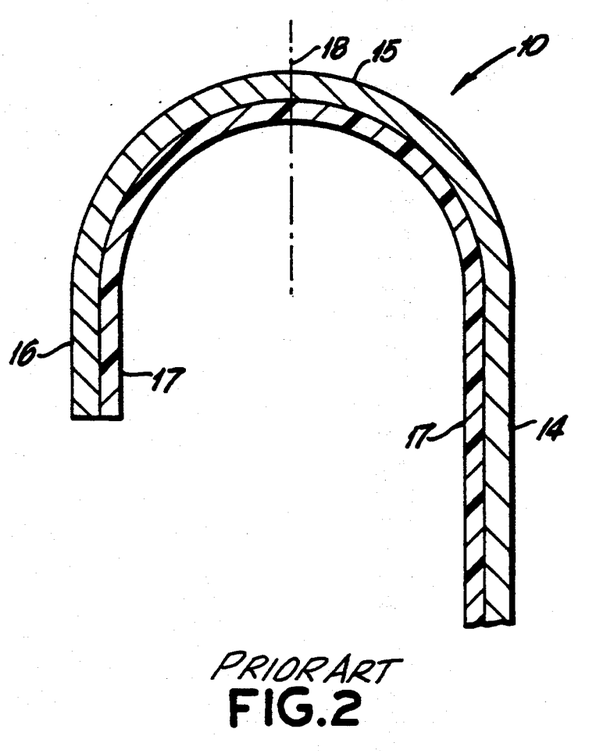
FIG. 2 is an enlarged, partial elevated sectional view of that portion of the mounting cup within the circular dotted line of FIG. 1.

FIG. 2 is an enlarged detail of the circled portion of FIG. 1 showing the upper portion of skirt 14, channel portion 15 and edge portion 16 in a sectional view. It is important to note that gasket material 17 is relatively uniform in thickness allowing for some variation, due to the fact that it is laminated to the flat sheet of metal from which the mounting cup 10 is made.

Figure 3:
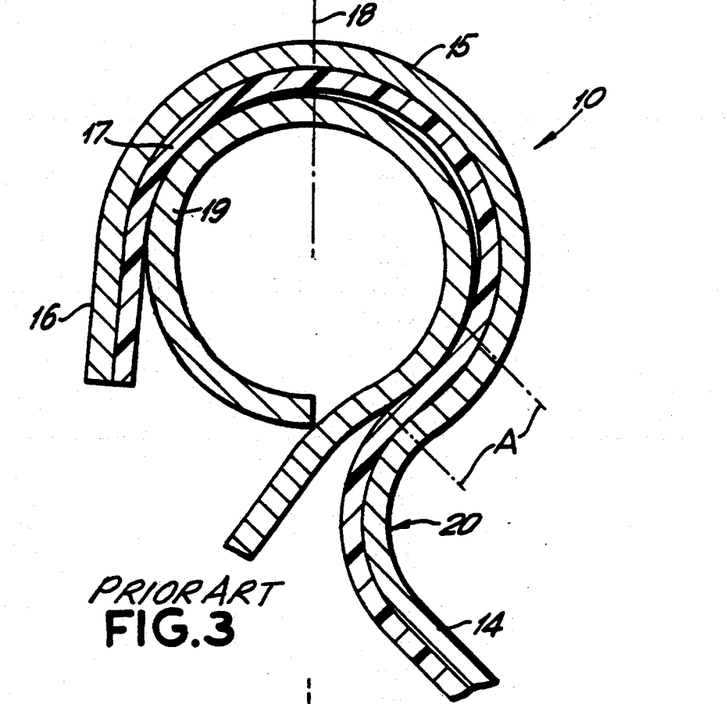
FIG. 3 is an enlarged partial elevated sectional view of the mounting cup of the prior art shown clinched onto the standard bead of an aerosol container.

FIG. 3 is a partial section of the mounting cup 10 after it is clinched over the standard bead 19 of an aerosol container (not shown). During the clinching process, the skirt 14 of the mounting cup 10 is plastically deformed radially outward as shown at 20 using conventional methods and apparatus familiar to the aerosol industry.

Clinching of the mounting cup 10 over the standard bead of the aerosol container 19 compresses the gasket material 17. It is believed that the primary seal occurs at Zone A because of the relatively large compressive force acting on gasket material 17, owing to the large deformation of the skirt 14 at section 20. It is expected that the remaining area of contact where the gasket material is held in compression between the channel portion 15 and the standard bead 19 serves as a secondary seal in the event that the primary seal is not established or fails. This secondary seal is enhanced by the fact that the typical valve mounting cup has an interior radius of curvature of the channel portion 15 slightly smaller than the exterior radius of the standard bead 19 of the container. Thus, during the clinching operation, the channel portion of the mounting cup is drawn tight over the standard bead thereby compressing the gasket material 17.

Figure 4:
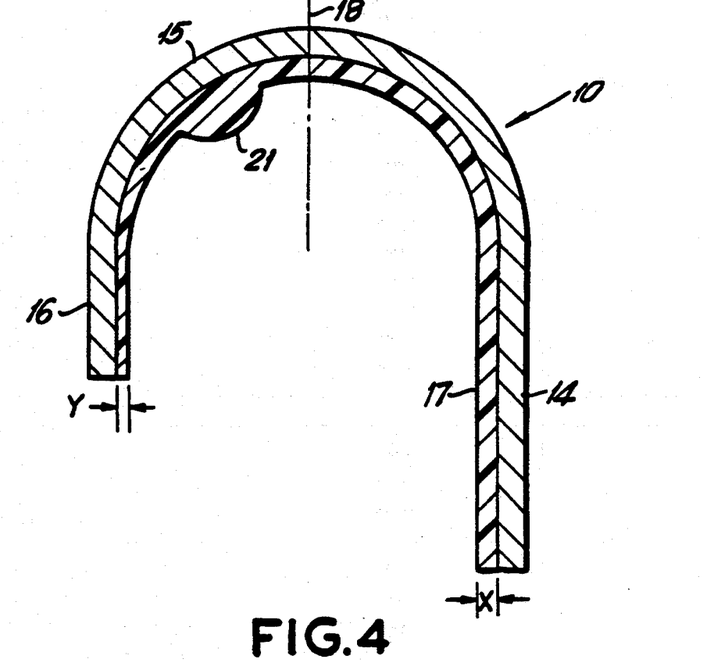
FIG. 4 is an enlarged, partial elevated sectional view of a mounting cup of a preferred embodiment of the invention.

In contrast to the prior art mounting cup with a relatively uniform but otherwise indiscriminate layer of gasket material in the channel portion thereof, this invention comprises a secondary seal in the form of an integral sealing bead formed of gasket material and includes a method for forming such a sealing bead without any increase in the amount of gasket material required. FIG. 4 is a partial section of an aerosol valve mounting cup 10 including a gasket configuration of the invention formed by utilizing the method of the invention. Shown at 21 is an annular sealing bead of gasket material 17 formed by the method illustrated in FIGS. 5A–C.

The sealing bead may be disposed outboard of the centerline of the mounting cup within the channel portion and in a portion of the channel where there is contact between the gasket mounting cup and the container bead. Positioning the bead 30° outboard of the centerline has been found satisfactory. In the instance of positioning the bead in the channel inboard of the centerline of the mounting cup, satisfactory seals have been effected by disposing the bead at 30° from the centerline of the mounting cup.

Figure 5A:
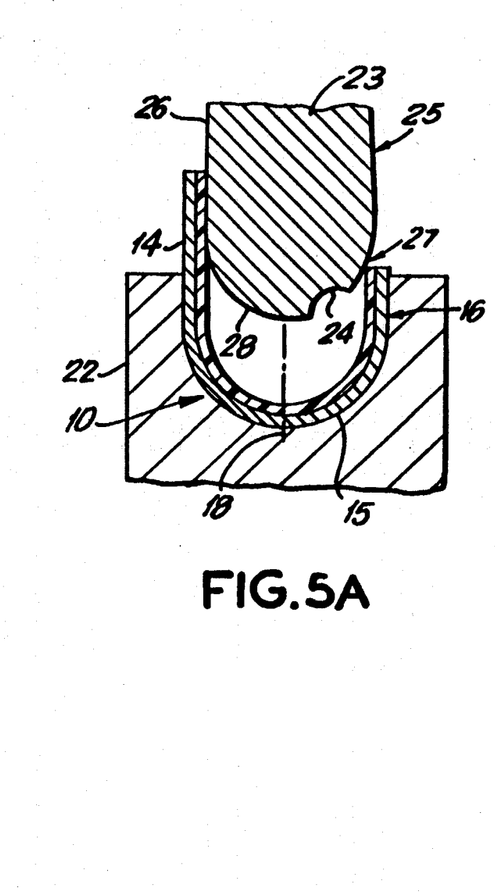
FIGS. 5A-C are partial sectional views of a mounting cup undergoing the operations comprising the method of the invention which results in the mounting cup of FIG. 4.
Figure 5B:
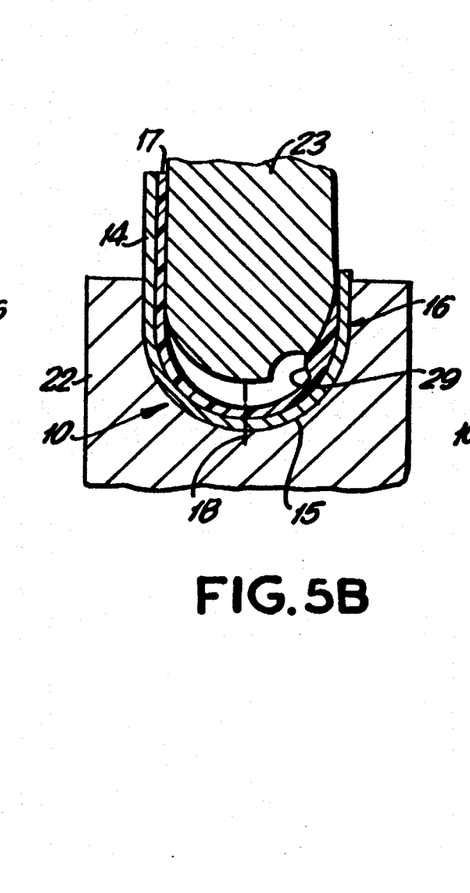
Figure 5C:
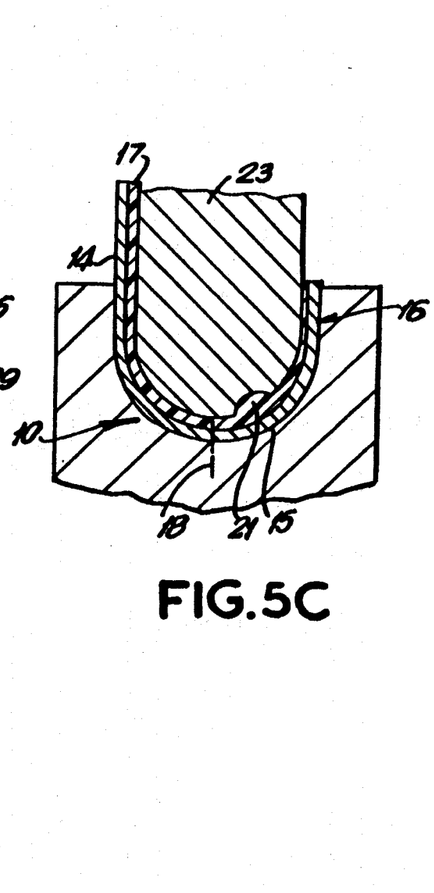

FIGS. 5A–C are partial sectional views showing the mounting cup 10 inverted and placed in an annular anvil 22 which is supported by the bed of a press (not shown). Annular punch 23 has a circumferential groove 24 here shown placed to the outside of centerline 18. Punch 23 is asymmetric with respect to centerline 18 with the distance between the centerline and exterior side 25 being greater than the distance between the centerline interior side 26, which latter distance is intended to match the distance between centerline 18 and the inside surface of the gasket material at skirt 14 within normal tolerances. Also, the radius of curvature of the outside portion of the punch at 27 is greater than the radius of curvature of the inside portion of the punch at 28. The radius of curvature of the inside portion of the punch 28 is intended to match the radius of curvature of the inside of the laminated gasket in channel 15 within normal tolerances. Thus, when the punch 23 is advanced to the end of its stroke as shown in FIG. 5C, it is intended that no significant deformation of the gasket material 17 inboard of centerline 18 occur. Conversely, outboard of the centerline the advance of the punch is intended to "iron"0 the gasket material 17 in the edge portion 16 into the groove 24 as shown at 29 in FIG. 5B. It is important to note that this ironing operation does not destroy the bond between the laminated gasket material 17 and the metal of the mounting cup. When the punch is retracted, the gasket material, now with an integral sealing bead, remains adhered to the channel portion of the mounting cup.

The groove 24 in FIG. 5A is shown as a chord of a circle in cross section for illustrative purposes only. Good results have been obtained using a groove of triangular cross section approximately 0.015" deep on 0.008" polyethylene gasket material laminated to 0.0105" tinplate. Also for illustrative purposes only, the gasket material is shown as completely filling the groove 24 when in fact, owing to air trapped in the groove and variations in material thickness within normal tolerances, it is likely that the cross sectional configuration of the final sealing bead 21 will not quite match the cross-sectional configuration of the groove 24.

The method illustrated in FIGS. 5A–C results in the gasket configuration shown in FIG. 4. It is important to note that the sealing bead 21 is cold-formed from gasket material adjacent the edge portion 16. Thus, the dimension "Y" is considerably smaller than "X" in FIG. 4 and the sealing bead 21 is considerably thicker than the original gasket thickness "X". This cold-forming operation can be simply added to the steps involved in the formation of the mounting cup in a multi-stage press. Depending on the laminate gasket material chosen, a heated punch can be used in place of the cold-forming operation of the preferred embodiment. In any event, a gasket configuration as shown in FIG. 4 is easy to achieve and free of any additional material cost.

Placing the sealing bead 21 outboard utilizes the gasket material adjacent the edge portion 16 which would otherwise not be significantly involved in forming the secondary seal. Surprisingly, it has now been found that formation of the sealing bead inboard of the centerline 18 yields a satisfactory seal. Contrary to expectation, the thinning of the gasket material on the skirt of the mounting cup during "ironing" does not result in a defective seal.

To form the secondary seal in the form of an integral sealing bead of gasket material on the inboard side (e.g. 30° of the centerline), the distance from the centerline to the interior side 26 of the punch is greater than the distance between the centerline and the exterior side 25, which latter distance is intended to match the distance between the centerline 18 and the exterior surface of the gasket material within normal tolerances. Also, the radius of curvature of the inside portion 28 of the punch is greater than the radius of curvature of the outside portion 27. The radius of curvature of the outside portion is intended to match the radius of curvature of the outside of the laminated gasket within normal tolerances. Thus when the punch is advanced to the end of its stroke, it is intended that no significant deformation of the gasket material outboard of the centerline occur. Conversely, inboard of the centerline the advance of the punch is intended to "iron" the gasket material on the skirt portion of the mounting cup into the annular groove in the punch. For the inboard bead, the circumferential groove 24 is placed on the inside of the centerline.

It should be apparent that one of the advantages of the invention lies in the ability to position a sealing bead very precisely within the channel portion of the mounting cup. This feature does not require any modifications to the existing methods employed or quality control standards observed in applying the gasket material to the channel portion of the mounting cup.

Figure 6:
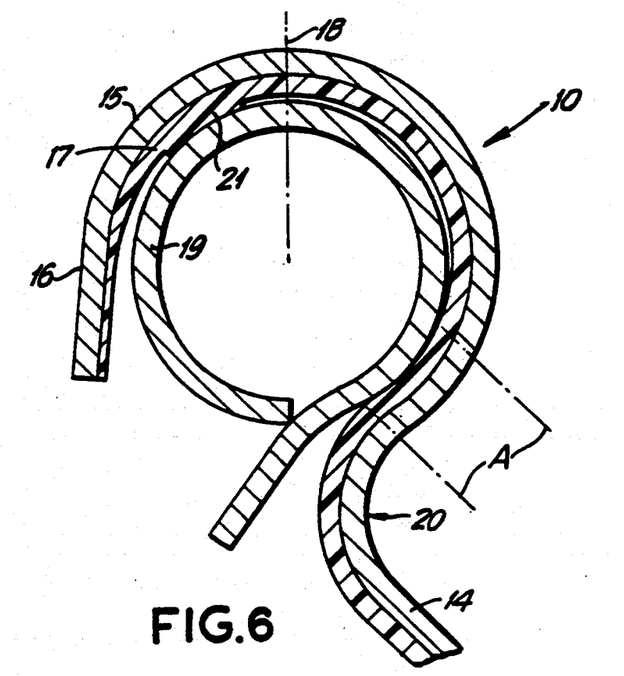
FIG. 6 is an enlarged partial elevated sectional view of the mounting cup of FIG. 4 after being clinched onto the standard bead of an aerosol container.

A gasketed mounting cup incorporating the sealing bead 21 cold-formed as illustrated in FIGS. 5A–C is shown (in partial section) clinched to the standard bead 19 of an aerosol container (not shown) in FIG. 6. Zone A is still believed to provide the primary seal as in FIG. 4 but the secondary seal is now concentrated at the sealing bead 21.

The sealing bead 21 is believed to provide a better secondary seal than the relatively uniform layer of gasket material (as shown in FIG. 2) for at least two reasons. First, the sealing bead offers increased thickness of resilient gasket material thereby increasing the gasket's ability to conform to surface irregularities on the container bead 19. Second, the force available to compress the gasket (no matter what its configuration) is limited by the geometry and material of the mounting cup. The use of a narrow sealing bead results in greater force per unit area being exerted on the gasket material of the sealing bead, thereby further increasing the depth of a surface irregularity which can be filled by the sealing bead.

It is possible to utilize the invention with gaskets of other types such as "flowed in" or "sleeve" type gaskets. The manufacture of gaskets of the latter type is disclosed in detail in U.S. Pat. Nos. 4,547,948 and 4,846,525 which disclosures are incorporated by reference and only briefly summarized above.

Figure 7:
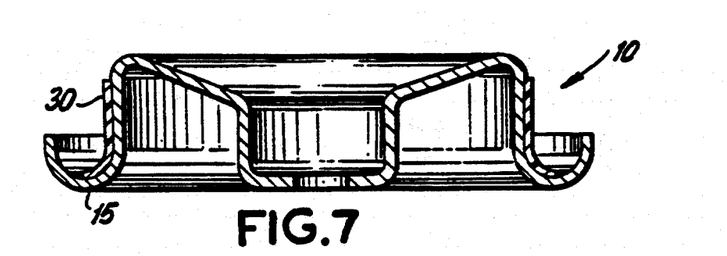
FIG. 7 is an elevated sectional view of a mounting cup of the prior art having a "sleeve" type gasket on the skirt portion thereof.
Figure 8:
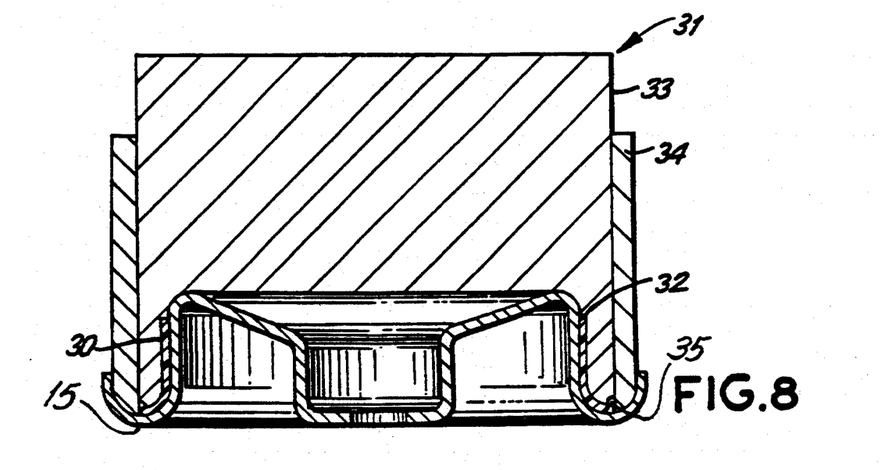
FIG. 8 is an elevated sectional view of a sleeve gasketed mounting cup to which the method of the invention is applied.

FIG. 7 shows an aerosol valve mounting cup 10 which has been fitted with a sleeve gasket 30 in accordance with the teachings of U.S. Pat. Nos. 4,846,525 and 4,547,948 discussed above. Unlike the laminate gasket material 17 of FIGS. 1–6, the sleeve gasket is not strongly adherent to the surface of the mounting cup and therefore cannot be "ironed" as easily as the laminate gasket. As part of the process of initially locating the sleeve gasket 30, it is forced by means of a stepped punch to "bottom out" in the lowest point of channel 15. To apply the invention to such gaskets, a two piece concentric punch 31, similar to that described in U.S. Pat. No. 4,559,198, may be employed in place of the one piece stepped punch described in U.S. Pat. Nos. 4,846,525 and 4,547,948. (The disclosure of U.S. Pat. No. 4,559,198 is incorporated herein by reference.) In FIG. 8, step 32 in the interior wall of the center punch 33 forces the gasket to slide down and into the bottom of the channel portion 15. The concentric outer punch 34 is bottomed in the channel portion 15 for the working stroke of center punch 33. As center punch 33 continues its advance, step 32 pushes gasket 30 against the bottom of outerpunch 34. Punch 33 continues its advance, forcing gasket material to gather into the annular void 35 formed by a notch in the point of center punch 33 and the lower edge of outer punch 34. Since the gasket material is in a highly plastic state at this point in the operation, the bead which gathers in void 35 will remain when the punches are removed.

Figure 9:
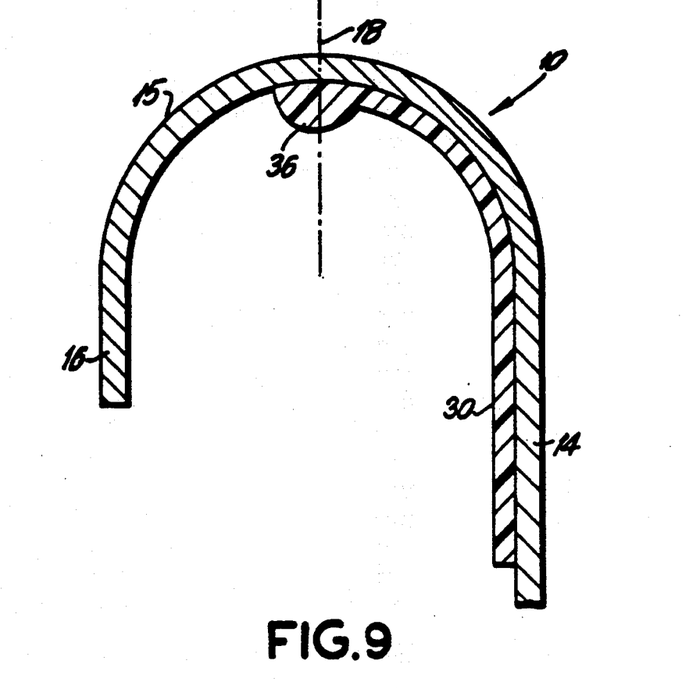
FIG. 9 is an enlarged partial elevated sectional view of a mounting cup of the invention as applied to gaskets of the "sleeve" type.

FIG. 9 shows the result of the application of the method illustrated in FIG. 8 to the mounting cup and gasket of FIG. 7. Sealing bead 36 is shown somewhat circular in cross section, but it should be appreciated that depending on the material chosen for the gasket 30, the sealing bead may in fact be nothing more than an irregularly shaped portion of thicker cross section.

Figure 10A:
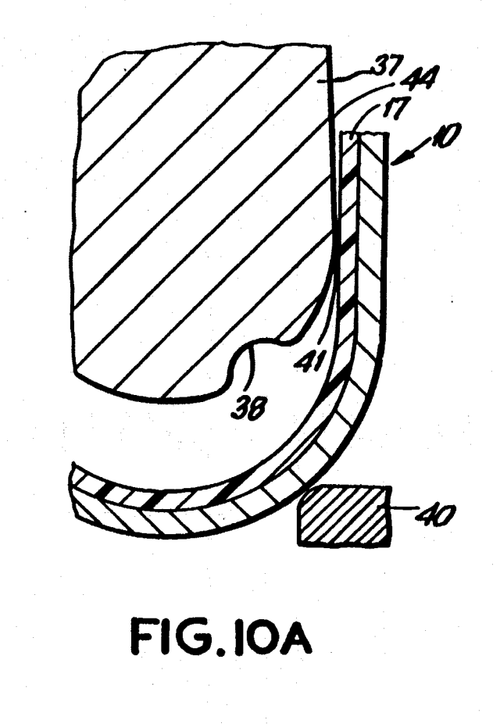
FIGS. 10A-C are partial sectional views of a mounting cup undergoing the combined operations of the method of the invention along with a method of forming an annular indent in the channel portion of the mounting cup.
Figure 10B:
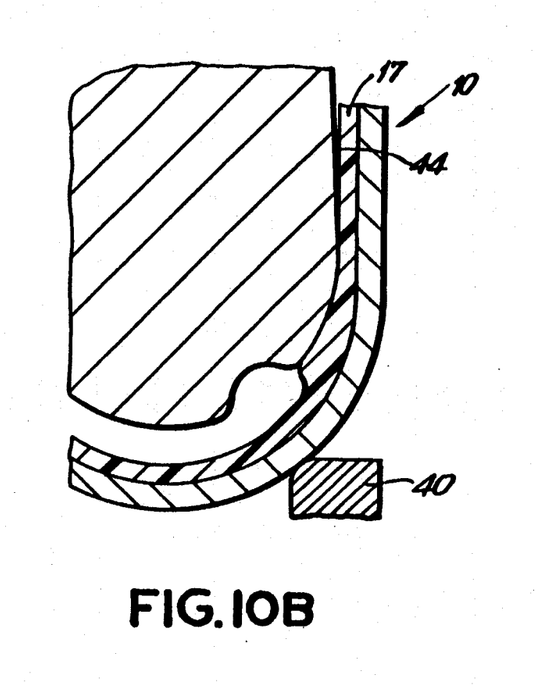
Figure 10C:
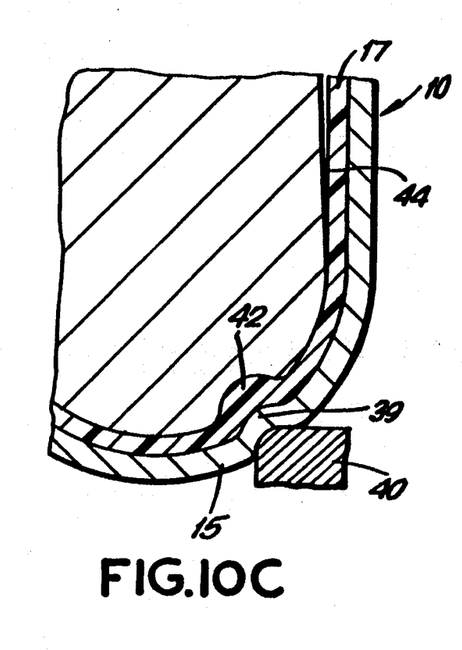

As noted previously, the invention may be used in conjunction with a modification of the shape and configuration of the channel portion of the mounting cup. Such modifications, whether designed to survive the clinching operation or not, involve a mounting cup with a non-semicircular cross section in the channel portion. Such modifications include a channel portion with an annular flat or taper in place of a portion of the standard semicircular cross section, which is not designed to survive the clinching operation. Such modifications also include an annular indent or depression, which is designed to survive the clinching operation. FIGS. 10A–C illustrate a method of forming an annular indent or depression 39 in the channel portion 15 of a valve mounting cup 10 along with an increase in the thickness of the laminate gasket material 17 forming a sealing bead coincident with the indent 39. As is apparent from FIGS. 10B and 10C, skirt 14 is inclined very slightly towards the center of the mounting cup when the cup is in the position shown. The punch 37 can be made with a straighter sidewall 44 which is sized so that it only "irons" a portion of the gasket material 17 laminated to skirt 14 into the annular groove 38. Ideally, punch 37 is sized so that gasket material is not sacrificed from the primary sealing zone to form the sealing bead 42.

It is apparent from FIGS. 10A–C that the stroke of the punch 37 both forms the indent 39 in the channel portion 15 by the cooperation of the bead or anvil ring 40 and annular groove 38, and also forms the increase in gasket thickness or sealing bead 42 at the point of the indent owing to the oversizing of the punch 37 at point 41 with respect to the normal dimensions of the interior of the gasketed mounting cup and the availability of the groove 38. As should be apparent, the groove 38 must be sized to accommodate the increased thickness of the gasket material 17 and the plastic deformation of the channel by the punch 37 and anvil ring 40.

Figure 11:
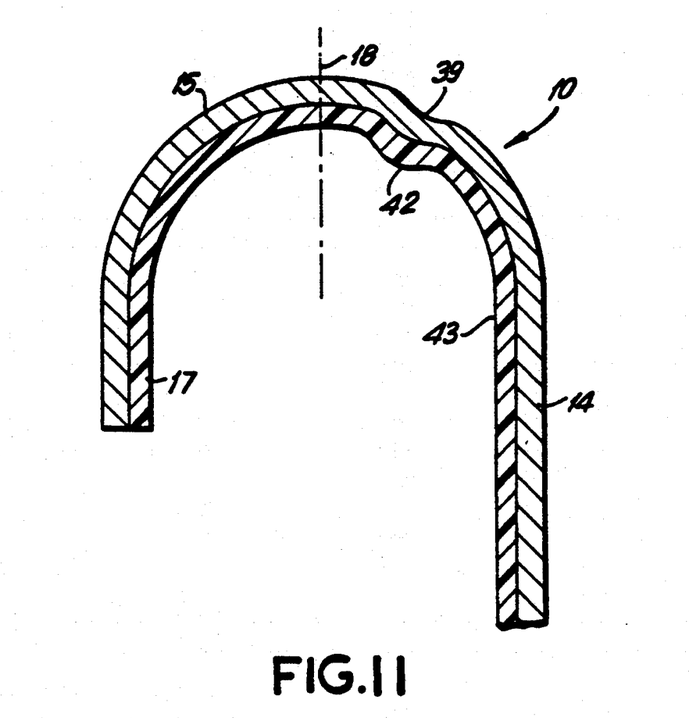
FIG. 11 is an enlarged, partial elevated sectional view of a mounting cup of the invention as applied in combination with an annular indent as results from the method illustrated in FIGS. 10A–C.

FIG. 11 illustrates the mounting cup 10 after the operation of the method illustrated in FIGS. 10A–C. Opposing the indent 39 is a sealing bead 42 which results from the gasket material "ironed" out of the section either side of point 43. Indent 39 and sealing bead 42 are shown on the inboard side of centerline 18 but it should be appreciated that it may be placed either side of or coincident with the centerline. If placed as shown in FIG. 11, it is possible to also include a sealing bead outboard of the centerline as an additional seal by modifying the punch in 10 accordance with the method illustrated in FIGS. 5A–C.

Although this invention has been described with specificity as to the preferred embodiments, it should be understood that numerous changes in detail, such as the use of a plurality of sealing beads in place of the single bead described and pictured herein, may be employed without departing from the spirit and scope of the invention as claimed below.

What is claimed:

1. The method of forming an improved gasket configuration for a mounting cup comprising the steps of:
   supporting a gasketed mounting cup in a press; advancing an annular grooved punch into the channel portion of the mounting cup to iron gasket material into the annular groove of the punch thereby forming an integral sealing bead in the gasket material; and retracting the punch.

2. The method of forming an improved gasket configuration for a mounting cup comprising the steps of:
   forming a mounting cup from metal which has gasket material laminated on one side thereof; supporting the laminate gasketed mounting cup in a press; advancing an annular grooved punch into the channel portion of the mounting cup to iron gasket material into the annular groove of the punch thereby forming an integral sealing bead in the gasket material; and retracting the punch.

3. The method of forming an improved gasket configuration for a mounting cup comprising the steps of:
   flowing gasket material into the channel portion of the mounting cup; supporting the mounting cup with flowed in gasket material in a press; advancing an annular grooved punch into the channel portion of the mounting cup to iron gasket material into the annular groove of the punch thereby forming an integral sealing bead in the gasket material; and retracting the punch.

4. The method of forming an improved gasket configuration for a mounting cup comprising the steps of:
   fitting a length of tubular sleeve type gasket material over the skirt portion of a mounting cup; advancing a two-piece concentric punch, having a center portion and an outer portion, into the channel portion of the mounting cup by leading with the outer portion which bottoms in the channel portion while the center portion engages the edge of the sleeve gasket farthest from the channel on a step of the center portion and forcing the sleeve gasket down the skirt so that it is compressed against the lower inside edge of the outer portion and collects into the sealing bead formed by a notch in the center portion, the lower edge of the outer portion and the channel portion itself; and retracting the two-piece punch.

5. The method of claim 4, wherein the sealing bead is formed in the portion of the gasket material located at the center of the channel portion.

6. The method of forming a mounting cup with at least one annular indent i the outer surface of the channel portion thereof along with an improved gasket configuration comprising the steps of:
   supporting a gasketed mounting cup against an annular anvil ring in a press; advancing an annular grooved punch into the channel portion of the mounting cup so that the groove opposes the anvil ring thereby forming an annular indent in the metal of the channel portion and also ironing gasket material into the annular groove of the punch thereby forming an integral sealing bead in the gasket material which is coincident with the annular indent; and retracting the punch.

7. The method of claim 1, 2, 3, or 6, wherein the sealing bead is formed in the portion of the gasket inboard of the centerline of the channel portion of the mounting cup.

8. The method of claim 7, wherein the sealing bead is located 30° from the centerline of the channel.

9. The method of claims 1, 2, 3, or 6, wherein the sealing bead is forming in the portion of the gasket outboard of the centerline of the channel portion of the mounting cup.

10. The method of claim 9, wherein the sealing bead is located 30° from the centerline of the channel.

* * * * *